United States Patent
Keam et al.

(10) Patent No.: US 8,184,101 B2
(45) Date of Patent: May 22, 2012

(54) DETECTING TOUCH ON A SURFACE VIA A SCANNING LASER

(75) Inventors: Nigel Keam, Redmond, WA (US); John Lewis, Bellevue, WA (US); Andrew D Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 11/866,562

(22) Filed: Oct. 3, 2007

(65) Prior Publication Data

US 2009/0091553 A1    Apr. 9, 2009

(51) Int. Cl.
*G09G 5/00* (2006.01)

(52) U.S. Cl. ..... 345/173; 345/175; 345/179; 178/18.01; 178/18.02; 178/19.01

(58) Field of Classification Search .......... 345/173–179; 178/18.01–18.09, 19.01
See application file for complete search history.

(56) References Cited

U.S. PATENT DOCUMENTS

| | | | |
|---|---|---|---|
| 4,938,570 A * | 7/1990 | Majima et al. ............... | 349/12 |
| 5,525,764 A | 6/1996 | Junkins et al. | |
| 6,333,735 B1 | 12/2001 | Anvekar | |
| 6,690,357 B1 | 2/2004 | Dunton et al. | |
| 6,816,537 B2 * | 11/2004 | Liess ............................. | 372/109 |
| 7,097,106 B2 | 8/2006 | Silverbrook et al. | |
| 7,126,586 B2 | 10/2006 | Jianping et al. | |
| 7,232,229 B2 | 6/2007 | Peeters et al. | |
| 2001/0055006 A1 | 12/2001 | Sano et al. | |
| 2005/0254106 A9 | 11/2005 | Silverbrook et al. | |
| 2007/0063981 A1 * | 3/2007 | Galyean et al. ............... | 345/173 |

OTHER PUBLICATIONS

Strickon, et al., "Tracking Hands Above Large Interactive Surfaces with a Low-Cost Scanning Laser Rangefinder", CHI'98 Conference, Apr. 21-23, ACM, pp. 2.
Paradiso, et al, "Sensor Systems for Interactive Surfaces", vol. 39, No. 3&4, IBM Systems Journal, IBM, 2000, pp. 892-914.
Paradiso, "Several Sensor Approaches that Retrofit Large Surfaces for Interactivity", Workshop on Collaboration with Interactive Walls and Tables, Sep. 29, 2002, Ubicomp 2002, ACM, pp. 1-8.

* cited by examiner

*Primary Examiner* — Quan-Zhen Wang
*Assistant Examiner* — Jennifer Nguyen
(74) *Attorney, Agent, or Firm* — Alleman Hall McCoy Russell & Tuttle LLP

(57) ABSTRACT

The detection of touch on an optical touch-sensitive device is disclosed. For example, one disclosed embodiment comprises a touch-sensitive device including a display screen, a laser, and a scanning mirror configured to scan light from the laser across the screen. The touch-sensitive device also includes a position-sensitive device and optics configured to form an image of at least a portion of the screen on the position-sensitive device. A location of an object relative to the screen may be determined by detecting a location on the position-sensitive device of laser light reflected by the object.

20 Claims, 3 Drawing Sheets

DETECTING TOUCH ON A SURFACE VIA A SCANNING LASER

BACKGROUND

Touch-sensitive devices may detect touch via several different mechanisms, including but not limited to optical, resistive, and capacitive mechanisms. Some optical touch-sensitive devices detect touch by capturing an image of a backside of a touch screen via an image sensor, and then processing the image to detect objects located on the screen. Such devices may include a light source within the device to illuminate the backside of the display screen such that objects on the screen reflect the incident light toward the image sensor.

In such devices, the screen may include a diffuser to diffuse light reflected from objects on the screen, as well as to diffuse an image projected onto the screen. The diffuser layer also causes objects lifted from the screen to appear blurry to an image sensor even at close ranges. However, where such a diffuser layer is omitted, it may be difficult to detect whether an object is on or spaced from the screen surface using an image sensor.

SUMMARY

Accordingly, various methods for detecting touch on an optical touch-sensitive device are described below in the Detailed Description. For example, one disclosed embodiment comprises a touch-sensitive device including a display screen, a laser, and a scanning mirror configured to scan light from the laser across the screen. The touch-sensitive device also includes a position-sensitive device and optics configured to form an image of at least a portion of the screen on the position-sensitive device. A location of an object relative to the screen may be determined by detecting a location on the position-sensitive device of laser light reflected by the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
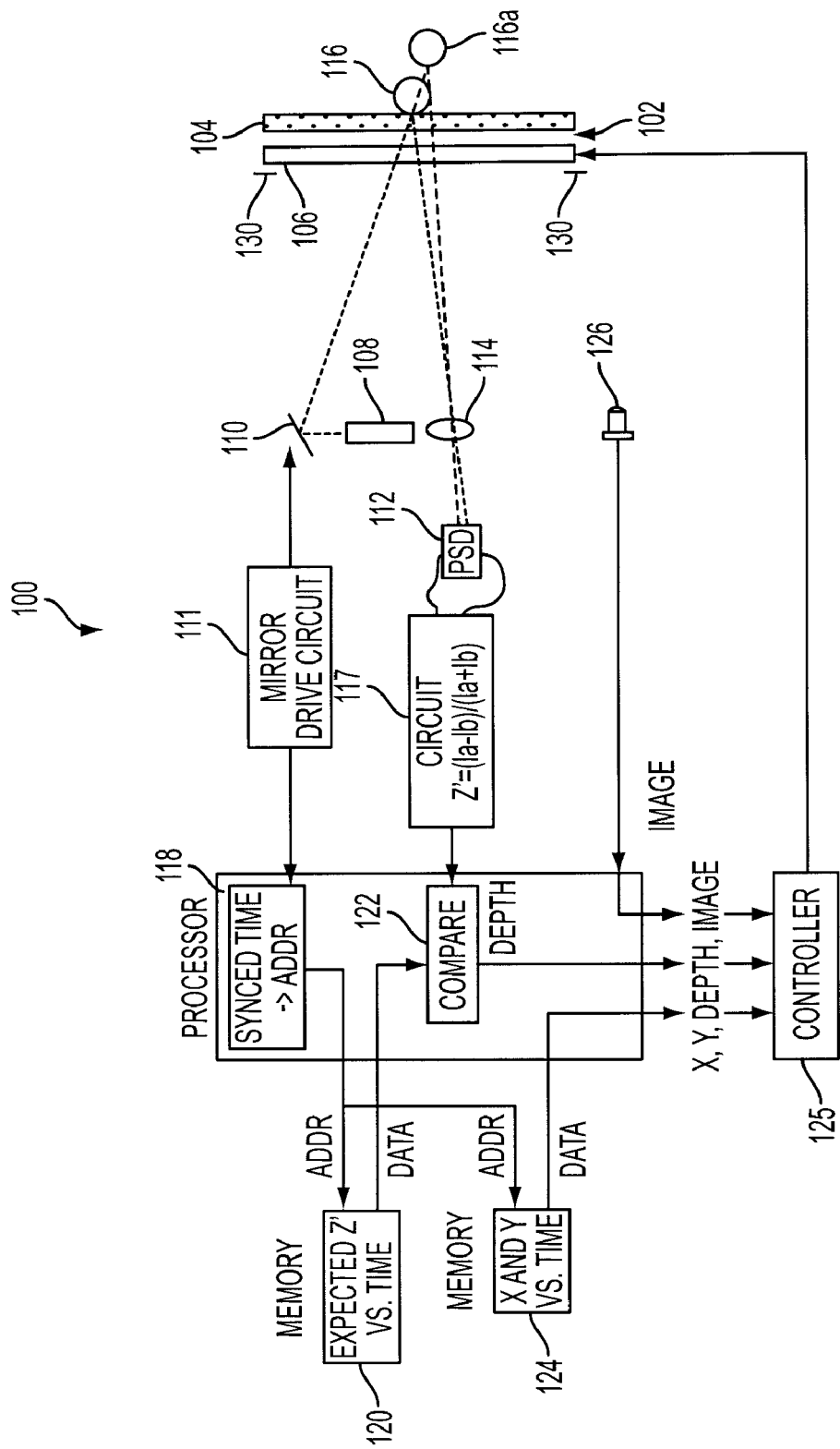
FIG. 1 shows a schematic diagram of an embodiment of a touch-sensitive device comprising a scanning laser and position-sensitive device.

FIG. 1 shows an embodiment of a touch-sensitive display device 100. Display device 100 comprises a display 102 comprising a display screen 104 and an image-producing element 106. The image-producing element 106 is configured to produce an image for viewing through display 102, and may include any suitable image-producing technology, including but not limited to one or more liquid crystal displays (LCD), organic light-emitting devices (OLEDs), and/or other suitable devices. The display screen 104 helps to protect image-producing element 106 from damage caused by objects touching the image-producing element. However, in some embodiments, the display screen 104 may be omitted such that objects are placed directly on the image-producing element 106.

Display device 100 further comprises a laser 108, a scanning mirror 110 controlled by a drive circuit 111 to raster scan light from the laser across the entire display 102, and a position-sensitive device 112 separated in a lateral direction from the laser and scanning mirror. Further, a lens 114 is disposed optically between the position-sensitive device 112 and the display 102 such that the lens forms an image of the display 102 on the position-sensitive device 112. Thus, laser light reflected from an object 116 touching the display or an object 116a spaced from the display will be imaged onto the position-sensitive device 112. In the depicted embodiment, the laser 108 and scanning mirror 110 are configured to direct light from the laser through the image-producing element 106. Therefore, the laser 108 may be selected to have a wavelength that is not absorbed by image-producing element. Furthermore, a laser that emits light outside of the visible spectrum, such as an infrared laser, may be used so that the scanning of the laser is not perceptible to a user. In alternative embodiments described below, the laser 108 and scanning mirror 110 may be configured to scan the display screen 104 in a manner that avoids passing through the image-producing element 106.

The position-sensitive device 112 outputs information regarding the location at which incident light hits the device. Because the position-sensitive device is separated laterally from the laser and scanning mirror, the location on which the reflected spot of laser light is incident on the position-sensitive device 112 is a function of the scanning mirror position and the distance of the object from the surface. The latter is illustrated in FIG. 1 by laser light reflected from an object 116A located above the surface hitting the surface of the position-sensitive device 112 at a different location than light reflected from an object 116 located on the surface. Therefore, the location at which the light is detected on the position-sensitive device 112 may be compared to an expected location to determine whether an object is touching the surface of the display 102 or is spaced from the display 102. If the light spot is in the expected location, then it can be determined that the object is touching the surface. Likewise, if the light spot is spaced from the surface by a threshold distance, then it can be determined that the object is spaced from the surface.

The position-sensitive device 112 may be either a one-dimensional device (as pictured) or a two-dimensional device. A one-dimensional position-sensitive device is configured to detect a location of light along one dimension. Such a device includes a bottom cathode plate, a semiconductor disposed over the plate with a bandgap configured to allow a current to flow through the semiconductor at a location where light strikes the semiconductor surface, and two anodes disposed on opposite sides of the semiconductor. Upon absorption of light, the location of the light along the direction between the electrodes can be determined from the relative current flows through each anode by a processing circuit 117 that performs the following calculation:

$$\text{Position } (Z) = k^*(I_a - I_b)/(I_a + I_b),$$

wherein Ia and Ib are the currents through the two anodes. In a two-dimensional device, two pairs of anodes allow the location of the light to be determined in two dimensions in a similar manner. It will be appreciated that the value of Z' will vary both as a function of the (x,y) coordinates of the screen location through which the laser is passing as well as the distance from the screen of any object reflecting the light.

A one-dimensional position-sensitive device may have a long, relatively thin configuration. Therefore, to ensure that a spot of reflected laser light from anywhere on display 102 may be imaged onto the device, lens 114 may comprise a cylindrical lens, or other non-circular lens arrangement. On the other hand, if a two dimensional position-sensitive device is used, the position-sensitive device may comprise a standard circular lens (compound or single) to image the light spot onto the position-sensitive device surface. Because information along one direction may be sufficient to determine whether an object is spaced from or touching the surface of display 102, the output of a single pair of anodes of a two-dimensional position-sensitive device may be used, and the output from the other pair of anodes may be ignored. Alternatively, the output from both pairs of anodes of a two-dimensional position-sensitive device may be used in some embodiments, for example, where it may be useful for synchronizing and/or imaging purposes.

The comparison of the detected light location on the position-sensitive device 112 to the expected location may be performed in any suitable manner. FIG. 1 schematically depicts one method for performing this comparison. The timing of the scanning mirror 110, which dictates the location illuminated on the surface of display 102, is also passed to a processor 118 or other processing circuitry. Processor 118 uses timed accesses to memory 120 to read an expected Z' value if an object were on the surface of the display 102 at that laser location. The expected Z' values may be calibrated, for example, by performing a scan of display 102 during which an object covered the entire surface of display 102.

Next, the expected Z' read from memory is compared to the value returned from the position-sensitive device and its associated circuit, as indicated at box 122. If the two are sufficiently close (i.e. within a predetermined or dynamically determined threshold distance), then it is concluded that an object is on the surface at the current (x,y) location. Otherwise, it is determined that the object is spaced from the surface. A second range of memory 124, or the output from the mirror drive circuit 111, may be used to derive the current (x,y) location of the scanned beam on the display 102. This information may then be used to control an image displayed on the display 102. This is shown schematically in FIG. 1 as output provided to a controller 125 that controls the display 102. It will be understood that some embodiments may not display visual feedback in response to an input from the position-sensitive device 112, and that input received from the position-sensitive device 112 may be used in any suitable manner and for any suitable purpose. For example, a detected input may also cause an auditory response, may launch a program (visible or invisible to a user), etc.

In some embodiments, one or more photodetectors 126 may be used to measure a magnitude of light reflected from an object on display 102. Correcting this magnitude for an ambient light level yields the brightness of the point being illuminated, and may be used in conjunction with the Z' signal to provide additional information on objects detected on the screen. For example, by determining a brightness at each location at which the laser beam passes through the display 102, a complete image of the display 102 can be assembled pixel-by-pixel. Then, this image may be processed via the processor 118, display controller 125, or other such circuitry, to image and track objects on display 102. This may allow, for example, orientations of one or more fingers touching the display to be determined, optically readable tags on objects to be read and tracked, etc. The photodetector reading may be corrected for ambient light by aiming the laser at a known non-reflective point on a regular basis and using the photodetector readout at that point as the ambient light level between ambient calibrations. It will be appreciated that the position-sensitive device 112 may also be used for imaging (wherein the magnitude of the current through the position-sensitive device may be used to derive a brightness value for a pixel). However, the response time of the position-sensitive device may not be as fast as that of a photodetector. Therefore, the use of a photodetector for imaging may provide faster response times and more detailed images.

The Z' signal may be used in conjunction with the photodetector signal to detect any suitable spatial relationship between an object and the display 102. For example, where it is desired to detect only objects touching the surface of the display 102 and not objects spaced from the surface, the photodetector output may be automatically switched to zero, corresponding to black, when an object is detected above the surface so that the object does not appear in the image of the display 102. Likewise, if it is desired to modify an image displayed on the display 102 in different manners for a detected touch versus a detected "hover", the Z' signal may be used to determine which modification to make to the displayed image.

In some embodiments, processor 118 and/or controller 125 may be configured to determine a height of an object above the screen from the Z' signal. Such a "hover" detector may allow, for example, a user to move a cursor via a finger "hovering" over the display 102, and then to touch the screen when the cursor is over a desired object to select the object. In yet other embodiments, the Z' signal may be used to make a simple binary "touching"/"not touching" decision, rather than to detect object height or hover. Where hover detection is used, processor 118 and/or controller 125 may be configured to compare a measured Z' value first against an expected Z' value for an object at the surface, and then to compare the measured Z' value to an expected Z' value for a hovering object if it is determined that the object is not on the surface. Different heights of hover may be detected in a similar manner.

Processor 118 may be synchronized with the laser 108 and scanning mirror 110 in any suitable manner. In the embodiment depicted in FIG. 1, the micromirror drive circuitry provides a signal directly to processor 118. Alternatively, the output signal from the photodetector 126 or position-sensitive device 112 may be compared with a known reflective pattern generated by passing the laser beam over a bezel 130 surrounding part or all of the display 102. The pattern may be used to generate sync pulses directly by observation, which may yield better modularity and independence of the image processing system from the laser scanning system.

The use of the position-sensitive device 112 may offer various advantages over other methods, such as the use of stereo cameras, of detecting a height of an object over a display surface. For example, the use of a position-sensitive device 112 allows a touching/hovering decision to be made without the use of a diffuser screen to obscure non-touching objects. Also, the use of the position-sensitive device 112 allows the laser 108 to be used for both object height detection and for image detection, thereby providing cost and space advantages. Further, where the laser is used both for image and height detection, the height detection and image detection will inherently be in sync, therefore simplifying image data processing. Additionally, the methods for detecting object height via stereo cameras may be complex, require significant processing and fallible. These methods also may not work well in the absence of object detail.

As described above, device 100 may be used to present interactive content to one or more users. Such an interactive system may be configured to allow a user to touch and/or place objects on and/or over display 102 to perform various functions, execute commands, etc. on the display. For example, the user may play games, move/edit/share photos, interact with audio/visual content, etc. with device 100. Each of these applications may utilize touch and/or hover detection to interpret user input.

Figure 2:
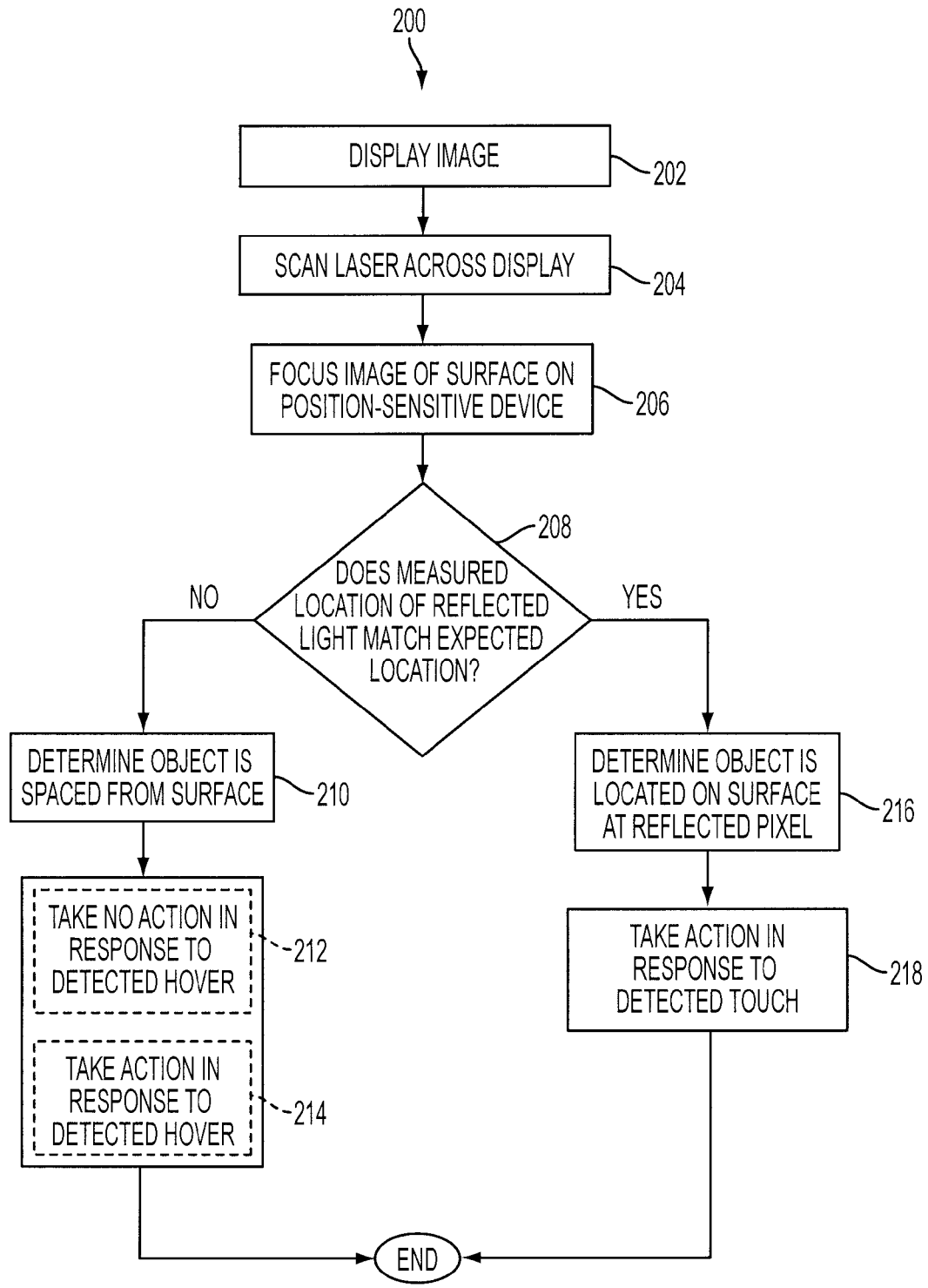
FIG. 2 shows a process flow depicting an embodiment of a method for detecting a location of an object relative to a surface via a scanning laser and position-sensitive device.

FIG. 2 shows a flow diagram of a method 200 that can be utilized by device 100, as well any touch-sensitive device, for receiving and responding to user touch input. Method 200 comprises, at 202, displaying an image on the display. The image may be any suitable image, including but not limited to computer graphics, computer animations, and video and photographic images, and may be provided by any suitable source, including but not limited to a television source (broadcast, cable, internet, etc.), a video source (DVD, CD, videotape, etc.), a portable storage device (digital camera, video camera, cell phone, solid state memory device, disk drive, etc.), and other such sources. It will be appreciated that the term "modify an image" as used in the description below comprises any visual feedback of any kind provided on a display in response to a detected touch or hover, and "image" refers to any portion of the overall image displayed on the display, including but not limited to a specific graphic displayed on a touched portion of the display.

Next, method 200 comprises, at 204 and 206 respectively, scanning a laser across the surface and focusing an image of the display surface on a position-sensitive device. Then, at 208, it is determined whether the location of a light spot detected on the position-sensitive device matches an expected location. If the location of the light spot on the position-sensitive device does not match an expected location closely enough, then it can be determined, at 210, that the object is spaced from the surface. This determination may be utilized in any suitable manner. For example, in some implementations, it may be desired to take no action in response to a detected hover, as indicated at 212. In other implementations, an action may be taken in response to a detected hover, as indicated at 214. Such an action may include modifying an image displayed on the display (for example, to animate a response to the detected touch, to visually indicate a launch of a program, etc.), providing an auditory response, launching a program, shutting device 100 down or putting the device to sleep, etc.

Referring again to 208, if it is determined that the measured location of the light spot matches the expected location, then it is determined at 216 that the detected object is located on the surface at the detected pixel (i.e. location). In this case, an action may be taken, as indicated at 218, in response to the detected touch.

Figure 3:
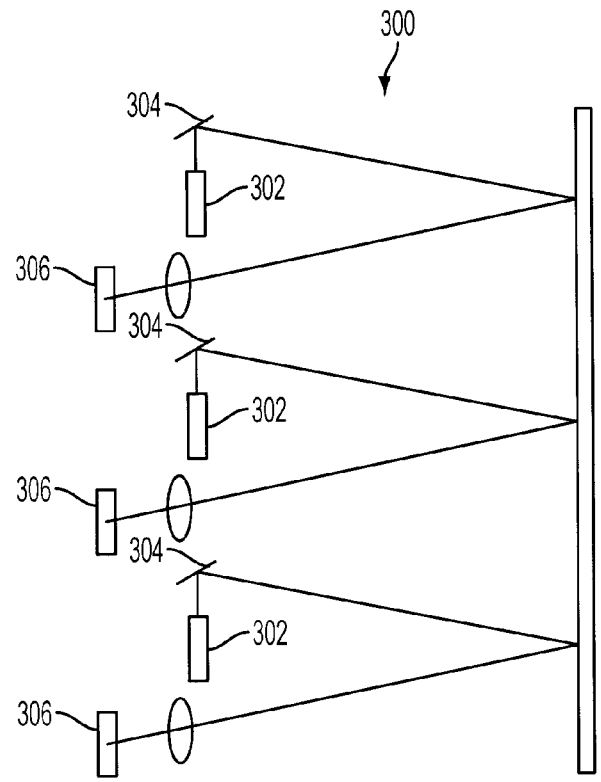
FIG. 3 shows a schematic diagram of another embodiment of a touch-sensitive device comprising a plurality of scanning lasers and associated position-sensitive devices.

In some situations, scanning the entire display 102 with a single laser may be impracticable. For example, a large display may take a significant amount of time to scan with a single laser. Therefore, referring to FIG. 3, another embodiment of a touch-sensitive display system 300 may have multiple lasers 302 and scanning mirrors 304 each configured to scan only a portion of the display. Each laser is detected by a separate position-sensitive device 306. By scanning in parallel, the entire area of the display 102 may be scanned more quickly than via a single laser and scanning mirror. In this embodiment, an image of the screen may be acquired from the outputs of the position-sensitive devices 306, from a plurality of photodetectors each configured to detect light reflected from a portion of the display 102, or in any other suitable manner. Further, the lasers may be configured to scan overlapping areas. In this case, the lasers may be synchronized so that when a first laser configured to be detected by a first position-sensitive device is aimed at an area visible a second position-sensitive device, any laser associated with the second position-sensitive device may be either disabled or aimed at an area not visible to the first position-sensitive device. While the depicted embodiment comprises three laser/mirror/position-sensitive device units, it will be appreciated that any suitable number of each of these devices may be used in any suitable combination to scan the display 102.

The optical paths between the laser, scanning mirror, display, and position-sensitive device, as well as the other optics in the system may have any suitable arrangement. For example, the laser may travel a straight path from the scanning mirror to the display, as depicted in FIG. 1. Alternatively, various other components may be used to modify the optical path. For example, a folded optical path (not shown) may be used where it is desired to decrease the size of a display device.

Figure 4:
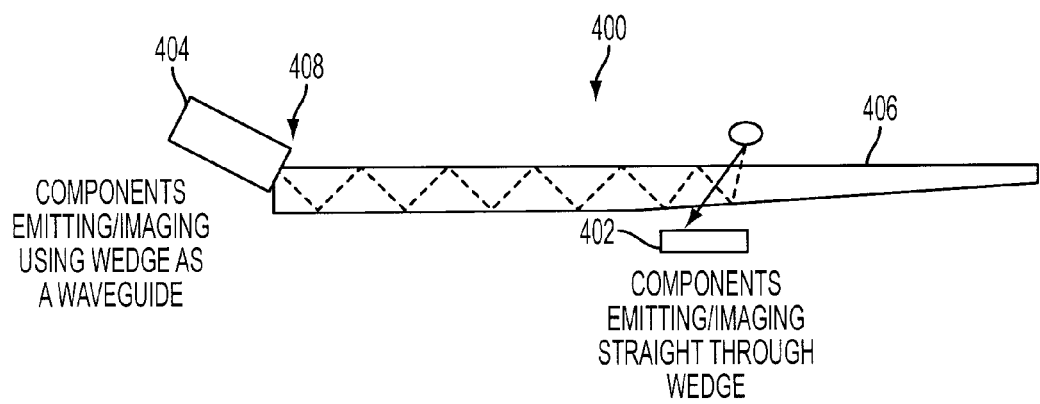
FIG. 4 shows a schematic diagram of another embodiment of a touch-sensitive device utilizing a scanning laser and position-sensitive device.

FIG. 4 shows an example of another potential optical path arrangement utilizing an internal reflection device in the form of an optical wedge 400 configured to internally reflect light for part of its path length, and then to emit the light at a point along the length of the wedge where the light is incident on the wedge face at an angle too steep for internal reflection to occur. The use of such an optical wedge may allow the depth of a device to be reduced compared to other optical arrangements.

The use of optical wedge 400 allows optical emitters and detectors to be placed in two different general locations for the purpose of presenting or detecting an image. First, components may be placed directly beneath the face of the wedge, as shown at 402. In this configuration, light can pass directly through wedge 400 without reflection or distortion. This allows, for example, an LCD or OLED panel to be placed directly beneath wedge to present an image to a viewer, and/or a camera or other image-capture device to be placed directly below optical wedge 400 to capture an image of the display surface (which may be a top surface 406 of the wedge) to identify objects on the surface.

Second components also may be placed at a corner 408 of the optical wedge 400 configured to allow light to internally reflect along a length of the optical wedge until reaching an angle at which the light escapes the optical wedge. Careful engineering of such a wedge may allow an image to be displayed through the top surface 406 of the wedge from an image-producing element (i.e. a LCD, OLED, liquid crystal on silicon (LCOS), digital micromirror device (DMD), or other microdisplay) located at the corner 408 of the optical wedge 400, or from an LCD panel or projection optical system located at position 402.

A laser and position-sensitive device may be used in various configurations with an optical wedge 400. For example, in one embodiment, a laser may be positioned at corner 408, and a position-sensitive device may be positioned at 402. The laser may be scanned by changing the location and/or angle at which the laser enters corner 408 such that the laser exits all rows and columns of pixels on the face 406 of the optical wedge 400. Laser light scattered by an object on or above the surface of the optical wedge 400 that passes through the optical wedge 400 may then be detected by the position-sensitive device at position 402. Alternatively, a position-sensitive device may also be located at corner 408. In this configuration, light scattered by the object at an appropriate angle will enter wedge 400 and then be internally reflected back to corner 408 for detection. In yet other embodiments, the laser may be located at position 402, and the position-sensitive device may be located either at position 402 or at corner 408.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A touch-sensitive device, comprising:
   a display;
   a laser;
   a scanning mirror configured to direct light from the laser through the display and to scan the light from the laser across the display;
   a position-sensitive device;
   optics configured to form an image of at least a portion of the display on the position-sensitive device; and
   a processor and memory containing instructions executable by the processor to determine a location of an object relative to the display by detecting via output from the position-sensitive device a location on the position-sensitive device of laser light reflected by the object back through the display.

2. The device of claim 1, wherein the instructions are executable to determine a location at which the object is touching the display.

3. The device of claim 1, wherein the instructions are executable to determine whether the object is spaced from the display.

4. The device of claim 1, wherein the instructions are executable to compare the location on the position-sensitive device of the image of laser light reflected with an expected location of the image of laser light from the laser based upon a position of the scanning mirror.

5. The device of claim 1, further comprising a liquid crystal display panel disposed adjacent to the display for presenting an image to a user.

6. The device of claim 1, wherein the position-sensitive device is a one-dimensional position-sensitive device.

7. The device of claim 1, wherein the position-sensitive device is a two-dimensional position-sensitive device.

8. The device of claim 1, further comprising one or more photodetectors and instructions executable to record an image of the display via the one or more photodetectors.

9. The device of claim 1, further comprising a plurality of lasers and a plurality of position-sensitive devices configured to scan a plurality of portions of the display in parallel.

10. The device of claim 1, wherein the optics comprises one or more of a circular lens and a cylindrical lens.

11. The device of claim 1, further comprising an internal reflection device to transmit light from the laser to the display and to transmit reflected light from the object through the display to the position-sensitive device.

12. In an optical touch-sensitive device comprising a display, a laser, a scanning mirror configured to scan light from the laser across the display, a position-sensitive device, and optics configured to form an image of the display on the position-sensitive device, a method of determining whether an object is touching the display or spaced from the display, the method comprising:
   directing the light from the laser through the display with the scanning mirror;
   scanning the light from the laser across the display with the scanning mirror;
   detecting a location on the position-sensitive device of an image of laser light reflected from an object and back through the display; and
   determining a location of the object relative to the display by comparing the location on the position-sensitive device of the image of laser light reflected from the object with an expected location of the image of light from the laser based upon a position of the scanning minor.

13. The method of claim 12, further comprising synchronizing the position-sensitive device and the scanning mirror by detecting on the position-sensitive device light reflected from one or more preselected calibration locations.

14. The method of claim 12, further comprising synchronizing the position-sensitive device and the scanning minor by comparing a signal from the scanning mirror with a signal from the position-sensitive device.

15. The method of claim 12, further comprising determining a location of the object on the display.

16. The method of claim 12, further comprising determining whether the object is spaced from the display.

17. A method of operating an optical touch-sensitive device with an optical touch-sensitive display, the method comprising:
   displaying an image viewable at the display;
   directing a laser through the display;
   scanning the laser across the display in two dimensions via a scanning mirror system;
   acquiring an image of the display via one or more photodetectors;
   forming an image of the display on a position-sensitive device;
   determining whether an object is touching the display or located over the display by comparing a location of laser light reflected back through the display in the image of the display with an expected location of reflected laser light based upon a position of the scanning mirror system; and
   modifying the image displayed on the display based upon whether the object is touching the display or spaced from the display.

18. The method of claim 17, further comprising determining a location of the object on the display.

19. The method of claim 17, further comprising modifying the image if the object is spaced from the display.

20. The method of claim 17, further comprising modifying the image only if the object is touching the display.

* * * * *